US006258194B1

(12) United States Patent
Danon

(10) Patent No.: US 6,258,194 B1
(45) Date of Patent: Jul. 10, 2001

(54) PROCESS FOR MANUFACTURING A PERSONALIZED STICKER

(76) Inventor: Sandra R. Danon, 333 S. Highland Ave., Los Angeles, CA (US) 90036

( * ) Notice: Subject to any disclaimer, the term of this patent is extended or adjusted under 35 U.S.C. 154(b) by 0 days.

(21) Appl. No.: 09/432,435

(22) Filed: Nov. 2, 1999

(51) Int. Cl.[7] ...................................................... B32B 31/00

(52) U.S. Cl. .......................... 156/155; 156/230; 156/237; 156/239; 156/240; 156/245; 156/277; 345/435; 355/22; 355/77; 434/365

(58) Field of Search .................................... 156/155, 230, 156/237, 239, 240, 245, 242, 277, 209; 345/435; 355/22, 77; 434/365

(56) References Cited

U.S. PATENT DOCUMENTS 5,695,346 * 12/1997 Sekiguchi et al. ................... 434/365
5,896,230 * 4/1999 Goggins ............................. 355/77 X
5,924,870 * 7/1999 Brosh et al. ......................... 434/365
5,967,032 * 10/1999 Bravenec et al. .................... 101/211
6,026,215 * 2/2000 Fantone et al. .................... 355/22 X

* cited by examiner

*Primary Examiner*—Jeff H. Aftergut
(74) *Attorney, Agent, or Firm*—Kelly Bauersfeld Lowry & Kelley, LLP

(57) ABSTRACT

A personalized sticker is manufactured by first creating a plurality of copies of a personalized image, with each copy differing in size, and then interlacing the copies to form an interlaced personalized image. The interlaced personalized image is filmed and the film is utilized to print the interlaced personalized image on a sheet of paper. A lenticular lense corresponding to the interlacing of the interlaced personalized image is then formed on a surface of a plastic laminate opposite the sheet of paper. The sheet of paper is removed and the personalized image is transferred to the plastic laminate. A protective backing is next applied to the interlaced personalized image opposite the lenticular lense, which is in turn attached to a double-sided adhesive sheet for later use.

20 Claims, 2 Drawing Sheets

PROCESS FOR MANUFACTURING A PERSONALIZED STICKER

BACKGROUND OF THE INVENTION

The present invention relates to adhesive decals. More particularly, the present invention relates to a method of producing a personalized sticker having a lenticular lense.

Adhesive decals, more commonly referred to as stickers, are widely used by both juveniles and adults. There currently exists a wide variety of different sticker styles and sizes. The sticker usually has an interesting phrase or design which conveys a message or is intended to aesthetically please the owner. The phrase or design may include musical groups, sports teams, comical statements, artistic designs, etc. Some stickers are black and white while others use brilliant colors. Still other stickers use light reflective or holographic images to capture the attention of onlookers.

However, there exists a need for a sticker which is interesting yet personalized to the owner. Such a sticker preferably includes the name of the owner and is formed so as to impart a changing design depending on the angle from which the sticker is viewed. The present invention is designed to fulfill these needs and provide other related advantages.

SUMMARY OF THE INVENTION

A method of manufacturing a personalized sticker conforming to the above needs is provided, generally comprising the steps of creating a personalized image, interlacing copies of the image, forming a lenticular lense surface, and attaching the interlaced image bearing the lenticular lense to an adhesive substrate. More specifically, a plurality of copies of a personalized image are first created, with each copy differing in size. Preferably the personalized image comprises a name. Each copy of the personalized image ranges from a full size image to an image 50% of the full size. Typically, the personalized image copies created are: full size, 90% full size, 80% full size, 70% full size, 60% full size and 50% full size.

The plurality of copies are interlaced to form an interlaced personalized image. The interlaced personalized image is then filmed and the film is utilized to print the interlaced personalized image on a sheet of paper. The sheet of paper is cooled and dried and then secured to a plastic laminate comprising a transparent polyvinylchloride film.

A lenticular lense corresponding to the interlacing of the interlaced personalized image is formed on a surface of the plastic laminate opposite the sheet of paper using a three-dimensional heat and pressure mold. The sheet of paper is removed by dissolving the sheet of paper in liquid. The personalized image is automatically transferred to the plastic laminate once the sheet of paper is removed.

A protective backing is applied to the interlaced personalized image opposite the lenticular lense. This is typically accomplished by silkscreening the protective backing to the interlaced personalized image. The protective backing of the plastic laminate is then attached to an adhesive substrate. The adhesive substrate is typically a double-sided adhesive sheet. The plastic laminate is usually attached by lamination. The sticker is then die-cut into its shape and cleaned.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
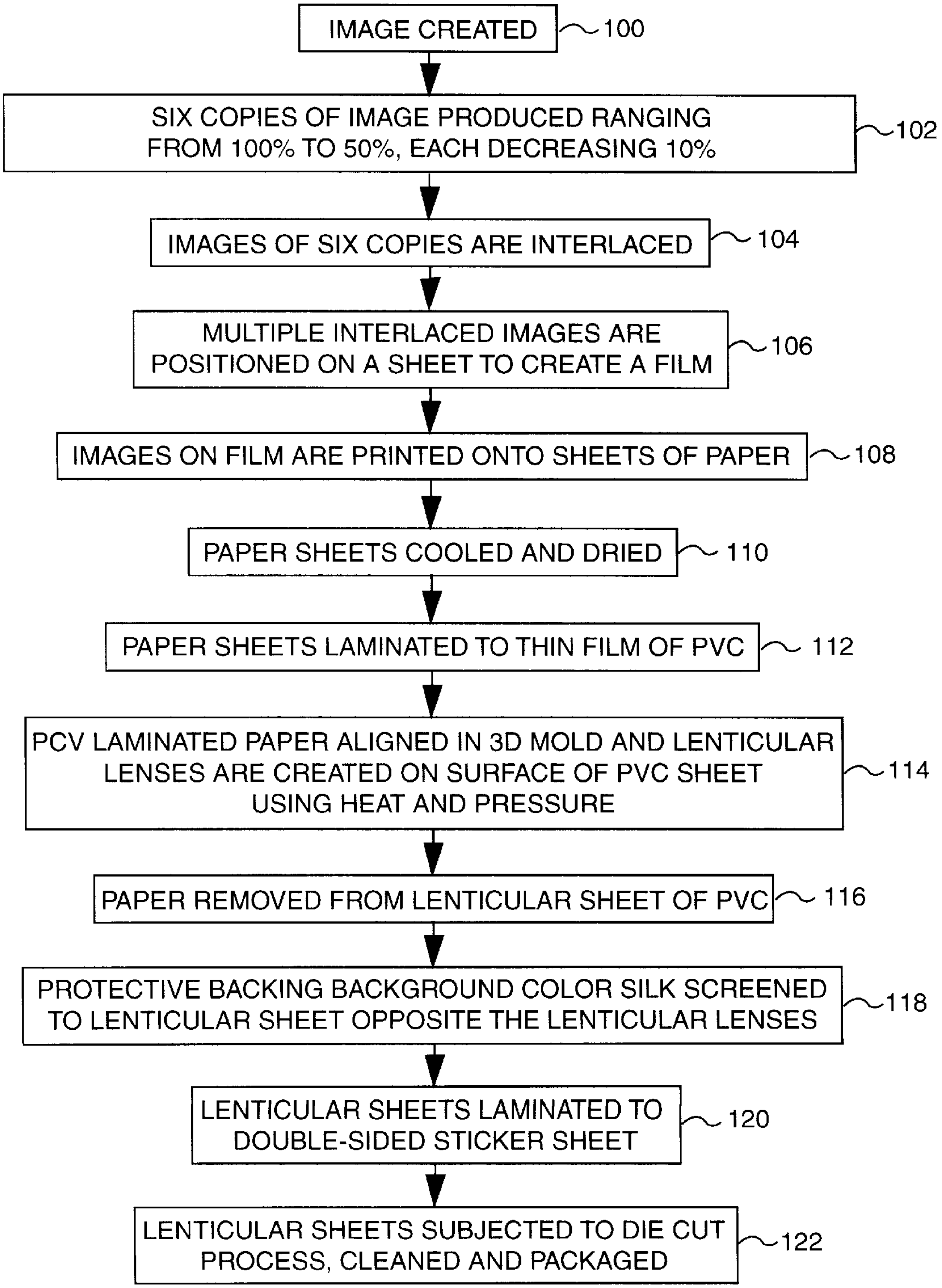
FIG. 1 is a flowchart generally illustrating the steps in the process of manufacturing the personalized sticker of the present invention.

As shown in the drawings for purposes of illustration, the present invention is concerned with a personalized lenticular lense sticker, generally referred to in the drawings by the reference number 10, and a method of producing the same. .With reference to FIG. 1, a personalized image is first created (100). The image is typically comprised of a commonly used name, such as Joe, Dave, Susan, etc., in order that the completed sticker 10 can be used by a consumer having the same name to identify various articles or otherwise used by that consumer for personal pleasure. Multiple copies are produced with each copy being reduced in a greater magnitude than the original image. Typically, six copies of the image are created ranging from full original image to 50% of the full original image (102). Accordingly, each copy is reduced by additional 10% from the original image. Resulting in the first copy being 100% of the original, the second copy being 90% of the original, the third copy being 80% of the original, the fourth copy being 70% of the original, the fifth copy being 60% of the original and the sixth copy being 50% of the original. If more than six copies are used, a similar approach is taken.

Figure 2:
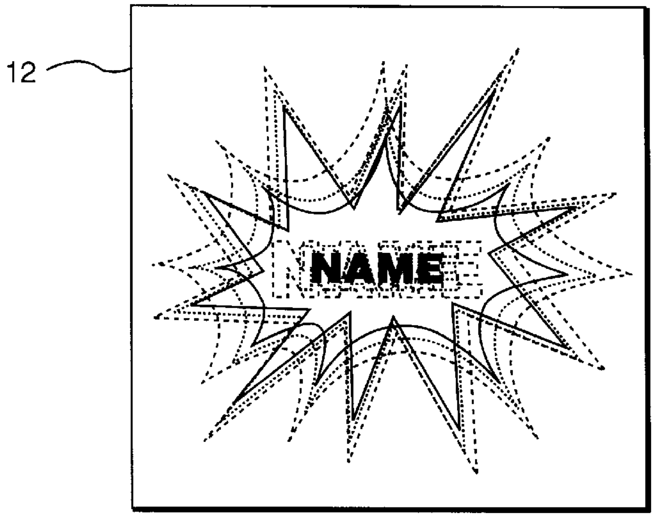
FIG. 2 is a top plan view of an interlaced personalized image used in the process of FIG. 1.

The images of the six copies are then interlaced to form an interlaced image (104). The interlacing procedure involves dividing each of the six copies into various lines having a predetermined width. Line 1 of the first copy is then transferred into the first line space of the resultant image. Line 2 of the second copy is transferred into the second line space of the resultant image. Line 3 of the third copy is transferred into the third line space of the resultant image. Line 4 of the fourth copy is transferred into the fourth line space of the resultant image. Line 5 of the fifth copy is transferred into the fifth line space of the resultant image. Line 6 of the sixth copy is transferred into the sixth space of the resultant image. Line 7 of the first copy is transferred into the seventh space of the resultant image. Line 8 of the second copy is transferred into the eighth space of the resultant image. This procedure is followed until the resultant image spaces are filled and an interlaced image is formed, as illustrated in FIG. 2.

A number of interlaced images 12 are positioned on a sheet to create a film (106). Usually, the interlaced images are grouped into sets of four which are positioned in such a way that each sheet contains 27 sets. The sets may all comprise the same personalized image or different personalized images depending on the production needs. The film is created using a film output device (imagesetter) using 3600 dpi resolution.

After the film is created, the film is printed onto sheets of paper (108). A five color sheet-feed offset printing machine is used for printing. For the process of the present invention, it is very important to obtain perfect registration for all five colors. Although It is acceptable to have 0.3 mm offset errors for normal printing, the lenticular printing of the present invention requires perfect registration. This is accomplished using newer high quality printing machines, such as the Heidlberg model, as well as coated paper, application of light pressing pressure, and marginal use of ink. Considerable time may be required to perfectly adjust the sheets.

After printing, the paper sheets are cooled and dried (110). The paper sheets are usually air conditioned for two days so that the ink may fully absorb into the paper. This time period is also needed to allow the paper to return to its original dimension. The sheet of paper expands 0.1% to 0.4% in size due to the ink/water application to the sheet of paper during printing. The paper returns to its original size once completely dry.

Figure 3:
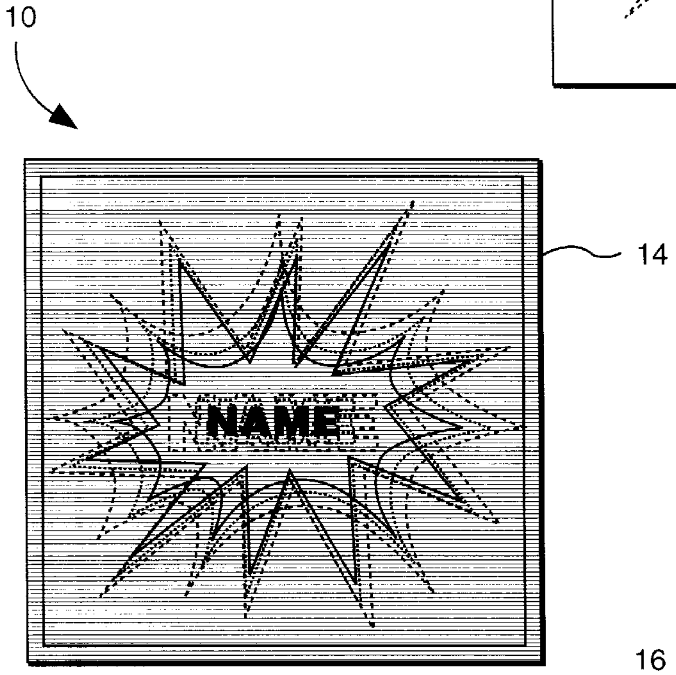
FIG. 3 is a top plan view of a completed personalized sticker embodying the present invention.

After the sheets of paper have cooled and dried (110), each sheet of paper is secured to a plastic laminate. This is accomplished by laminating the sheet of paper to a thin transparent polyvinylchloride (PVC) film (112). The PVC laminated paper sheet is then aligned in a three-dimensional mold which uses heat and pressure to form a lenticular lense 14 on the surface of the PVC opposite the sheet of paper (114). The paper sheet must be perfectly aligned in the mold so that the lenticular lense 14 corresponds to the interlaced image 12. The lenticular lense 14 comprises a plurality of linear ridges and intervening depressions closely spaced apart and parallel to one another, as illustrated in FIG. 3.

After the lenticular lense 14 is formed, the paper sheet is removed from the PVC film (116). This is accomplished by placing the PVC laminated sheet of paper in a liquid, such as water, and letting the paper dissolve away from the lenticular plastic laminate. The ink will naturally remain adhered to the plastic rather than the paper.

The ink remains exposed on the backside of the lenticular plastic sheet and at this point can easily be scratched or worn off. To prevent this, and also to bring more clarity to the interlaced ink image, a protective background, in the form of white ink, is silkscreened onto the back of the lenticular plastic laminate sheet opposite the lenticular lense (118). Each lenticular sheet is then attached to a double-sided sticker sheet 16 opposite the lenticular lense surface 14.

Each sheet is die cut in sets and then in individual stickers 10. Normal stickers require only two die cut steps, however, due to the soft and pliable nature of the plastic PVC, each sheet is first die cut into three parts, each part is then semi-die cut into the sticker shape, and then finally die cut into the individual sticker. The die cut stickers are then cleaned and packaged (122).

Figure 4:
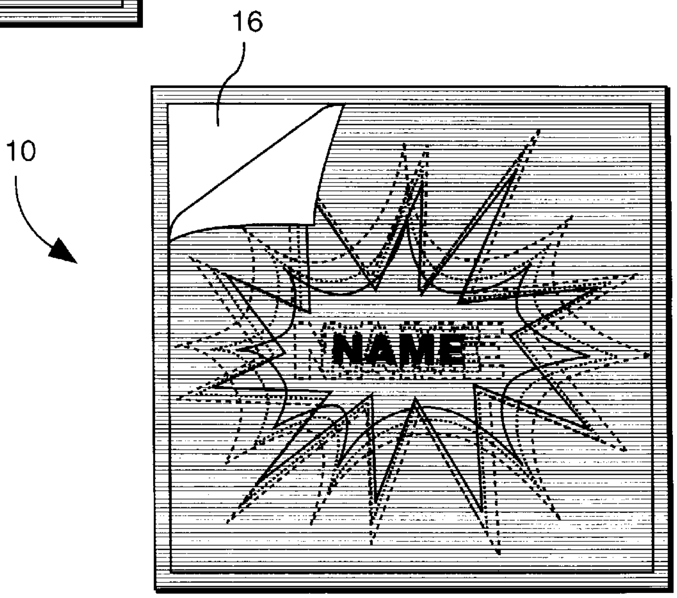
FIG. 4 is a top plan view similar to FIGS. 2 and 3, illustrating removal of the personalized sticker from an adhesive sheet.

In use, the sticker 10 is peeled away from the double-adhesive sheet as illustrated in FIG. 4. At least part of the adhesive of the double-adhesive sheet remains on the protective backing of the sticker 10 so that the sticker 10 can be adhered to objects. The corresponding lenticular lense and interlaced image give the appearance of an expanding and shrinking name and image when viewed from various angles or when the sticker 10 is bent or otherwise manipulated. The sticker 10 of the present invention affords the consumer an interesting yet practical way of identifying personal objects. The sticker may also be placed on objects solely for personal enjoyment.

Although an embodiment has been described in detail for purposes of illustration, various modifications may be made without departing from the scope and spirit of the invention. Accordingly, the invention is not to be limited, except as by the appended claims.

What is claimed is:

1. A method of manufacturing a personalized sticker, comprising the steps of:
- creating a plurality of copies of a personalized image, each copy differing in size;
- interlacing the plurality of copies to form an interlaced personalized image;
- placing a lenticular lense over the interlaced personalized image so that the lenticular lense corresponds with the interlacing of the interlaced personalized image; and
- attaching an adhesive substrate to the interlaced personalized image opposite the lenticular lense.

2. The method of claim 1, wherein the creating step includes the step of creating several copies of the personalized image ranging from a full size image to an image 50% of the full size.

3. The method of claim 2, wherein the personalized copies created are: full size, 90% of full size, 80% of full size, 70% of full size, 60% of full size, and 50% of full size.

4. The method of claim 1, including the steps of filming the interlaced personalized image and then utilizing the film to print the interlaced personalized image onto a sheet of paper before the placing step.

5. The method of claim 4, wherein the placing step includes the step of securing the sheet of paper to a plastic laminate and forming the lenticular lense on a surface of the plastic laminate opposite the sheet of paper.

6. The method of claim 5, wherein the plastic laminate comprises a transparent polyvinylchloride film.

7. The method of claim 5, including the steps of cooling and drying the sheet of paper before the securing step.

8. The method of claim 5, wherein the forming step includes using a three-dimensional heat and pressure mold.

9. The method of claim 5, including the steps of removing the sheet of paper by dissolving it in liquid, and transferring the interlaced personalized image to the plastic laminate.

10. The method of claim 1, including the step of applying a protective backing to the interlaced personalized image opposite the lenticular lense before attaching the adhesive substrate.

11. The method of claim 10, wherein the applying step includes the step of silkscreening a protective backing onto the interlaced personalized image.

12. The method of claim 1, wherein the attaching step includes the step of laminating the interlaced personalized image to a double-sided adhesive sheet.

13. A method of manufacturing a personalized sticker, comprising the steps of:
- creating a plurality of copies of a personalized image, each copy differing in size;
- interlacing the plurality of copies to form an interlaced personalized image;
- filming the interlaced personalized image;
- utilizing the film to print the interlaced personalized image on a sheet of paper;
- securing the sheet of paper to a plastic laminate comprising transparent polyvinylchloride film;
- forming a lenticular lense corresponding to the interlacing of the interlaced personalized image on a surface of the plastic laminate opposite the sheet of paper;
- removing the sheet of paper and transferring the interlaced personalized image to the plastic laminate;
- applying a protective backing to the interlaced personalized image opposite the lenticular lense; and
- attaching the protective backing of the plastic laminate to a double-sided adhesive sheet by lamination.

14. The method of claim 13, wherein the creating step includes the step of creating several copies of the personalized image ranging from a full size image to an image 50% of the full size.

15. The method of claim 14, wherein the personalized copies created are: full size, 90% of full size, 80% of full size, 70% of full size, 60% of full size, and 50% of full size.

16. The method of claim 13, including the steps of cooling and drying the sheet of paper before the securing step.

17. The method of claim 13, wherein the forming step includes using a three-dimensional heat and pressure mold.

18. The method of claim 13, wherein the removing step includes the step of dissolving the sheet of paper in liquid.

19. The method of claim 13, wherein the applying step includes the step of silkscreening a protective backing onto the interlaced personalized image.

20. A method of manufacturing a personalized sticker, comprising the steps of:

creating a plurality of copies of a personalized image comprising a name, ranging from a full size image to an image 50% of the full size;

interlacing the plurality of copies to form an interlaced personalized image;

filming the interlaced personalized image;

utilizing the film to print the interlaced personalized image on a sheet of paper;

cooling and drying the sheet of paper;

securing the sheet of paper to a plastic laminate comprising transparent polyvinylchloride film;

forming a lenticular lense corresponding to the interlacing of the interlaced personalized image on a surface of the plastic laminate opposite the sheet of paper using a three-dimensional heat and pressure mold;

removing the sheet of paper by dissolving the sheet of paper in liquid and transferring the interlaced personalized image to the plastic laminate;

applying a protective backing by silkscreening the protective backing to the interlaced personalized image opposite the lenticular lense; and attaching the protective backing of the plastic laminate to a double-sided adhesive sheet by lamination.

* * * * *